(12) United States Patent
Sakayama et al.

(10) Patent No.: US 9,185,244 B2
(45) Date of Patent: Nov. 10, 2015

(54) IMAGE FORMING APPARATUS, IMAGE FORMING METHOD, AND NON-TRANSITORY COMPUTER READABLE MEDIUM

(75) Inventors: Takashi Sakayama, Kanagawa (JP); Makoto Sano, Kanagawa (JP); Toru Osamura, Kanagawa (JP); Yoshiharu Yoshida, Kanagawa (JP); Hiroyuki Nakada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 13/482,646

(22) Filed: May 29, 2012

(65) Prior Publication Data

US 2013/0141748 A1    Jun. 6, 2013

(30) Foreign Application Priority Data

Dec. 1, 2011  (JP) ................................. 2011-263996

(51) Int. Cl.
*G06F 15/00*    (2006.01)
*H04N 1/00*    (2006.01)

(52) U.S. Cl.
CPC .... *H04N 1/00222* (2013.01); *H04N 2201/3205* (2013.01); *H04N 2201/3207* (2013.01); *H04N 2201/3209* (2013.01)

(58) Field of Classification Search
CPC .............. H04N 2201/3207; H04N 2201/3205; H04N 2201/3209
USPC ......................................................... 358/1.14
See application file for complete search history.

(56) References Cited

U.S. PATENT DOCUMENTS

| 6,064,839 | A  | * | 5/2000 | Nakamura | ........................ 399/80 |
| 2006/0274353 | A1 | * | 12/2006 | Nemoto | ........................ 358/1.14 |
| 2011/0058210 | A1 | * | 3/2011 | Aizono et al. | ................ 358/1.14 |
| 2013/0293921 | A1 | * | 11/2013 | Aizono et al. | ................ 358/1.14 |

FOREIGN PATENT DOCUMENTS

JP    A-2004-5736    1/2004

* cited by examiner

*Primary Examiner* — Saeid Ebrahimi Dehkord
(74) *Attorney, Agent, or Firm* — Oliff PLC (57) ABSTRACT

An image forming apparatus includes an accepting unit, and a controller. The accepting unit accepts an instruction to execute an image forming process. The controller controls the accepting unit so as to prohibit the accepting unit from accepting an instruction to collectively execute multiple image forming processes when a billing device is usable which bills a user for execution of an image forming process and which is incapable of acquiring user identification information for identifying a user.

12 Claims, 6 Drawing Sheets

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-263996 filed Dec. 1, 2011.

BACKGROUND

Technical Field

The present invention relates to an image forming apparatus, an image forming method, and a non-transitory computer readable medium.

SUMMARY

According to an aspect of the invention, there is provided an image forming apparatus including an accepting unit, and a controller. The accepting unit accepts an instruction to execute an image forming process. The controller controls the accepting unit so as to prohibit the accepting unit from accepting an instruction to collectively execute multiple image forming processes when a billing device is usable which bills a user for execution of an image forming process and is incapable of acquiring user identification information for identifying a user.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below.

First Exemplary Embodiment

In this exemplary embodiment, a case will be described in which the present invention is applied to an image forming apparatus that has functions of executing multiple image forming processes to be provided to a user, e.g., a scanning process of scanning a document and acquiring image data, a copying process of printing a scanned document, a process of transmitting a scanned document by fax, and a process of transmitting a scanned document as an email.

Figure 1:
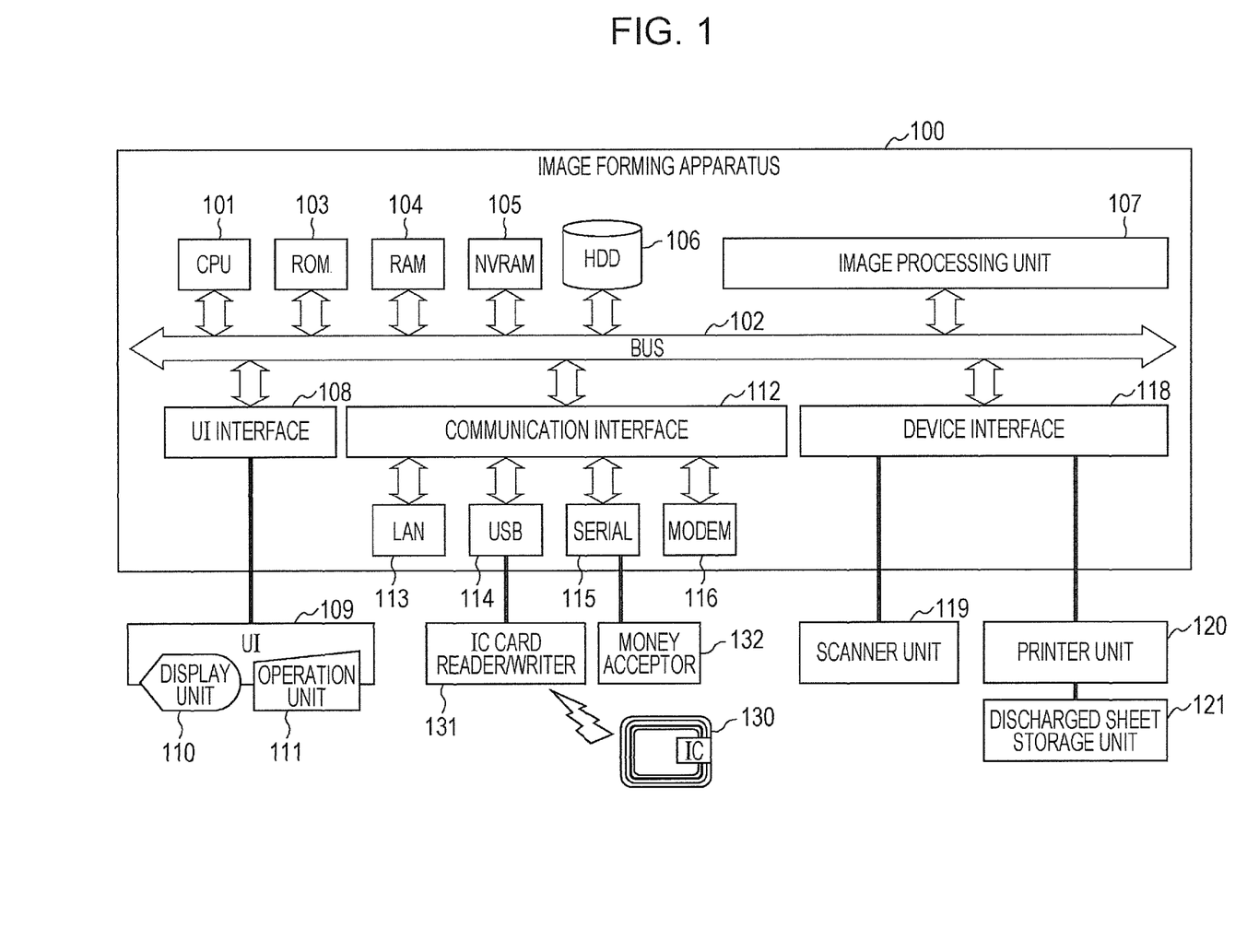
FIG. 1 is a block diagram illustrating an example of a hardware configuration of an image forming apparatus.

FIG. 1 schematically illustrates a hardware configuration of an image forming apparatus 100 according to an exemplary embodiment of the present invention. Each component of the image forming apparatus 100 will be described below.

A central processing unit (CPU) 101 is a controller that controls operations of the image forming apparatus 100. The CPU 101 executes a program in an execution environment provided by the operating system, thereby controlling various image forming processes, such as copying, facsimile transmission and reception, and network printing. The CPU 101 is connected to each component of the image forming apparatus 100 via a bus 102.

A read only memory (ROM) 103 is constituted by a read only semiconductor memory device. Various control programs for executing image forming processes such as network printing, fixed data, and so forth are written on the ROM 103 permanently. The ROM 103 may be constituted by a device, such as a flash memory, in which stored data is electrically rewritable. In this case, the programs and the fixed data may be updated as needed.

A random access memory (RAM) 104 is constituted by a semiconductor memory device in which data is rewritable, and is used as a system memory for execution of programs. For example, a control program to be executed by the CPU 101 is loaded into the RAM 104 from the ROM 103, and data used during execution of a program is temporarily stored in the RAM 104. The RAM 104 is also used as a page memory for image processing.

A nonvolatile RAM (NVRAM) 105 is constituted by a memory, such as a flash memory, in which data is rewritable and stored content is not lost even in a state where no electric power is supplied thereto. The NVRAM 105 is used for storing security data and other nonvolatile data, image-quality adjustment and various other setting parameters, various histories regarding execution of image forming processes, and so forth.

A hard disk drive (HDD) 106 is an external mass storage device constituted by a fixed magnetic recording disk. The HDD 106 is used for accumulating image data that results from scanning of documents, storing various histories regarding execution of image forming processes, and installing programs to be executed by the CPU 101.

An image processing unit 107 performs various kinds of image processing, such as compression, decompression, and image quality adjustment, on image data that results from scanning of documents or image data downloaded via a network.

The image forming apparatus 100 includes, as a user interface (UI) 109, a display unit 110 such as a liquid crystal display (LCD) and an operation unit 111 including hardware buttons, such as a start button, a stop button, and numeral buttons (or including a touch panel that also serves as the display unit 110). The UI 109 is connected to the bus 102 via a UI interface 108. Alternatively, the UI 109 may be directly controlled by the CPU 101 not via the UI interface 108.

Additionally, various external devices, network interfaces, and so forth are connected to the bus 102 via a communication interface 112.

A local area network (LAN) interface 113 connects the image forming apparatus 100 to a network in accordance with a predetermined protocol, such as 10/1000 Base-T. A wireless LAN interface may also be included.

The image forming apparatus 100 is connected to an external network, such as the Internet, via a LAN, and accesses a desired information resource. The image forming apparatus 100 receives, from a personal computer (PC) or mobile terminal (not illustrated) used by a user, instruction data in which content of each of various image forming processes, such as copying, facsimile transmission and reception, content retrieval, other content processing, and network printing, is written. The image forming apparatus 100 executes an image forming process in accordance with instruction data. In addition, plural pieces of instruction data in each of which content of an image forming process is written may be pre-stored in the HDD 106 or the like, and the image forming apparatus 100 may execute a piece of instruction data selected by a user from among the stored pieces of instruction data. Furthermore, a user may specify plural image forming processes, and the image forming apparatus 100 may collectively execute the specified plural image forming processes.

In the image forming apparatus 100, an integrated circuit (IC) card reader/writer 131 is connectable to the bus 102 via a universal serial bus (USB) interface 114 in order to perform contactless/near field communication with an IC card 130. The USB interface 114 is based on, for example, the USB 1.1 standard or the USB 2.0 standard.

In a case where the IC card reader/writer 131 is connected to the image forming apparatus 100, the IC card 130 and the IC card reader/writer 131 perform a predetermined mutual authentication process and then perform contactless/near field communication over a transmission channel based on electromagnetic coupling, electromagnetic induction, or radio communication while maintaining high tamper resistance. Since the mechanism of the contactless communication using the IC card 130 is not directly related to the gist of the present invention, the mechanism will not be described any further. The communication between the IC card 130 and the IC card reader/writer 131 is not limited to contactless/near field communication. The IC card reader/writer 131 may have a slot to which the IC card 130 is to be inserted, and the IC card 130 may be inserted into this slot, whereby the IC card 130 and the IC card reader/writer 131 may perform wired communication.

In this exemplary embodiment, information for identifying a user of the image forming apparatus 100, e.g., user identification information, such as a user ID, serving as an identification code for identifying a user, is pre-recorded on the IC card 130. The user identification information does not have to be information for identifying each user, but may be information that enables identification of the IC card 130, such as a card ID uniquely assigned to the IC card 130.

Additionally, in this exemplary embodiment, the IC card 130 has, for example, an electronic money function, which enables billing for a service provided by the image forming apparatus 100. When such an IC card 130 having the electronic money function is positioned, the IC card reader/writer 131 functions as a billing device. The IC card 130 is not limited to the card having the electronic money function but may be an IC card, such as an employee ID card, which has authentication information (such as employee ID) for authenticating that a subject is an employee recorded thereon. When such an IC card 130 having the authentication information recorded thereon is positioned, the IC card reader/writer 131 functions as an authentication device.

In addition, in the image forming apparatus 100, a money acceptor 132 (e.g., a device called "CoinKit") serving as a billing device is connectable to the bus 102 via a serial interface 115, such as RS232C. Although FIG. 1 illustrates a case in which both the IC card reader/writer 131 and the money acceptor 132 are connected to the image forming apparatus 100, it is sufficient that at least one of the IC card reader/writer 131 and the money acceptor 132 is connected in order to perform billing for an image forming process.

The money acceptor 132 is a billing device to which a user inserts coins or items having equivalent values, and which just bills a user for an image forming process provided by the image forming apparatus 100. Accordingly, unlike the IC card reader/writer 131, the money acceptor 132 is incapable of acquiring user identification information for identifying a user of the image forming apparatus 100.

A modem 116 is constituted by a modulator and a demodulator that perform signal conversion between a signal used in a computer and a signal used on a public line. The modem 116 connects a facsimile to a public line, and provides various facsimile functions, such as normal facsimile transmission and reception and time-specified facsimile transmission.

A device interface 118 is constituted by, for example, RS422, and realizes an interface protocol for connecting various devices constituting the image forming apparatus 100 to the bus 102.

The image forming apparatus 100 includes, as its constituent devices, a scanner unit 119 that scans an image from a document, and a printer unit 120 that prints an image on a sheet, for example.

The scanner unit 119 generally includes a platen on which a document is positioned, and a scanner that performs image scanning. The scanner unit 119 may be an automatic document feeding scanner. Image data of the scanned image undergoes image processing in the image processing unit 107 as needed, and is output as an image by the printer unit 120 or is stored in the HDD 106.

The printer unit 120 includes, for example, an electrophotographic print engine. An electrophotographic process includes plural sub-processes, i.e., charging of electrophotographic photoconductors, exposure of the photoconductors to a scanned document image, development in which toners are applied onto latent images formed on the photoconductors, transferring and fixing of toners onto a sheet, and cleaning of the photoconductors. However, the configuration of the print engine is not directly related to the gist of the present invention, it will not be described any further. The sheet having the image printed thereon by the printer unit 120 is discharged to a discharged sheet storage unit 121.

A user of the image forming apparatus 100 performs various image forming processes. In this exemplary embodiment, the image forming processes refer to processes performed on document data (data including at least one of a document and an image), and include, but not limited to, a copying process, a printing process, a facsimile transmission process, an email transmission process, and a scanning process.

Figure 2:
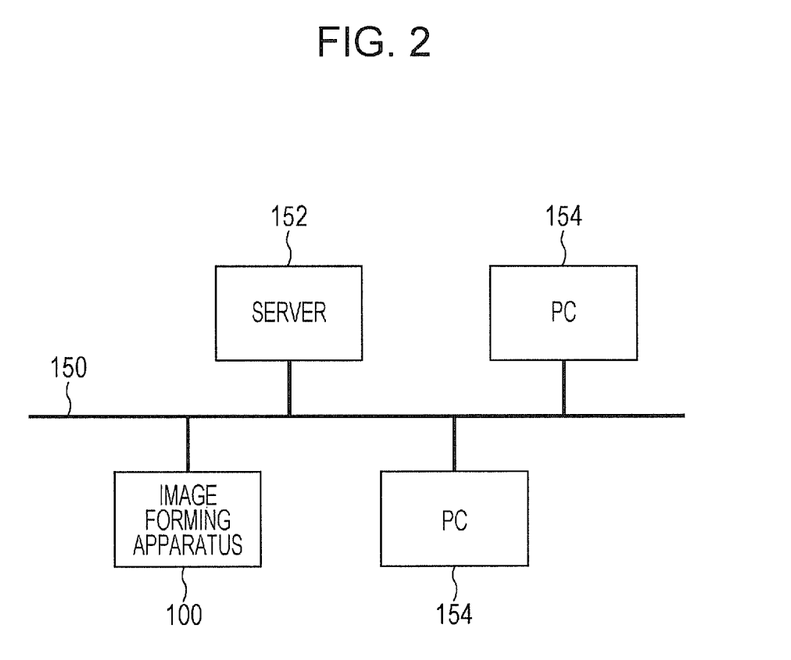
FIG. 2 illustrates a configuration of a network to which the image forming apparatus is connected.

As illustrated in FIG. 2, such an image forming apparatus 100 is connected to a network 150 via the LAN interface 113. A server 152 storing document data and so forth, and personal computers (PCs) 154 are also connected to this network 150.

A user of the image forming apparatus 100 operates the operation unit 111 of the image forming apparatus 100, thereby being able to receive services related to various image forming processes, such as a copying process, a facsimile transmission process, and a scanning process regarding a document positioned in the scanner unit 119, and a printing process regarding document data stored in the HDD 106 of the image forming apparatus 100 and document data stored in the server 152. Additionally, the user instructs the image forming apparatus 100 to print document data supplied from the PC 154, thereby being able to receive a service related to an image forming process, such as a printing process regarding document data.

Regarding image forming processes that involve billing, a user inserts money into the money acceptor 132 or positions the IC card 130 having the electronic money function in the IC card reader/writer 131, whereby billing is enabled. In this way, a user is able to receive services related to the image forming processes.

The money acceptor 132 is a device that just bills a user with a fee corresponding to an image forming process by using inserted money. Thus, the money acceptor 132 is incapable of acquiring user identification information for identifying a user. For example, suppose that a user inserts coins into the money acceptor 132, and specifies multiple documents to instruct the image forming apparatus 100 to collectively execute printing processes. In this case, if a printing process of another user from the PC 154 interrupts the printing processes of the multiple documents, the user may be undesirably billed for the printing process of the other user.

Accordingly, in this exemplary embodiment, when billing is performed by the money acceptor 132 for an image forming process of a user, the image forming apparatus 100 prohibits acceptance of an instruction to collectively execute multiple image forming processes.

Now, a process executed by the CPU 101 will be described with reference to a flowchart illustrated in FIG. 3.

This process is implemented in a manner as follows: the image forming apparatus 100 is turned on; and then the CPU 101 loads a predetermined control program stored in, for example, the ROM 103 or the HDD 106 into the RAM 104 and executes the loaded control program. In this exemplary embodiment, a case will be described in which one of the IC card reader/writer 131 and the money acceptor 132 is connected as the billing device, and a user performs a printing process.

Figure 3:
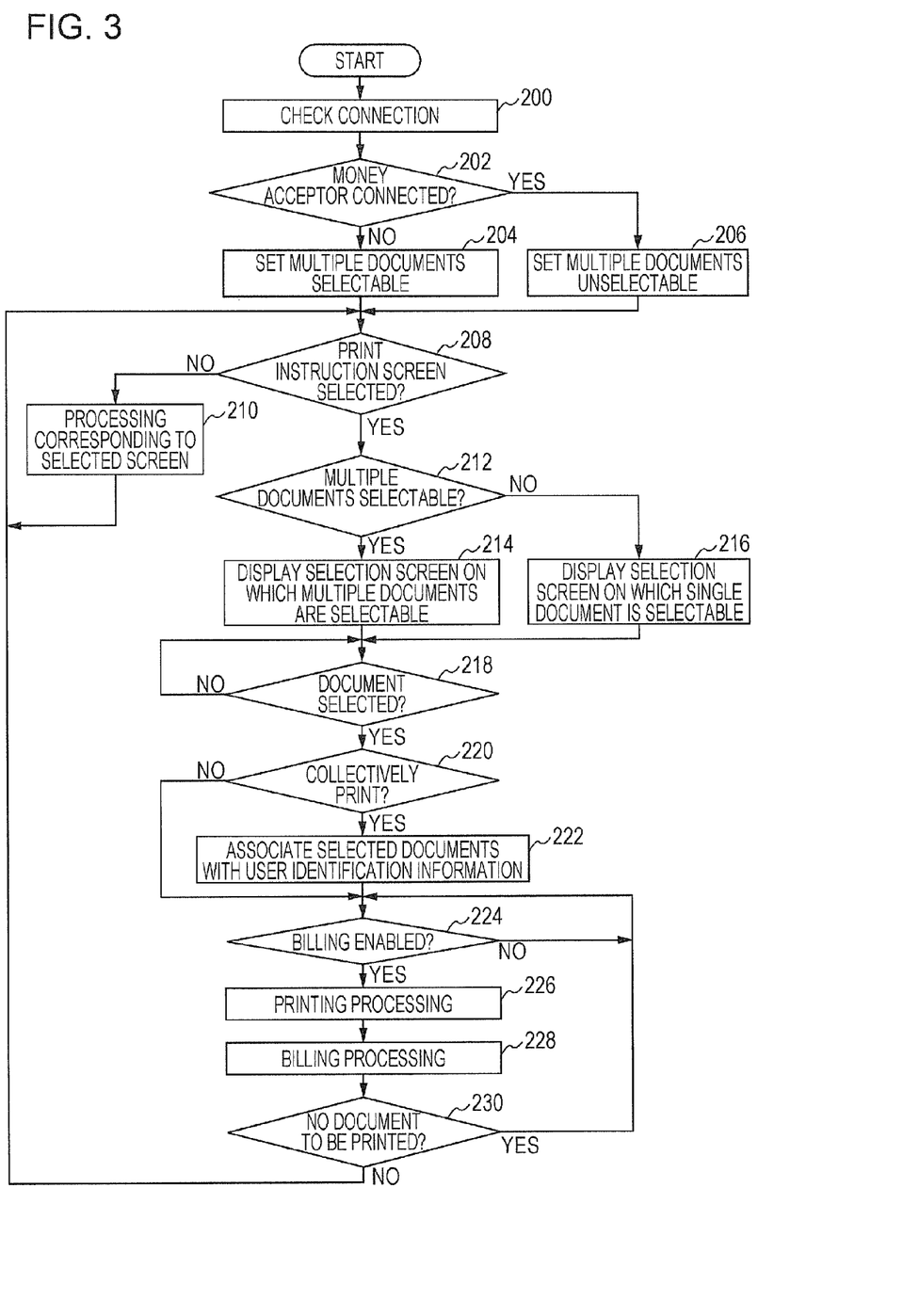
FIG. 3 is a flowchart of a process executed by a central processing unit (CPU) of an image forming apparatus according to a first exemplary embodiment.

In step 200 illustrated in FIG. 3, the CPU 101 determines whether or not the billing device is connected to at least one of the USB interface 114 and the serial interface 115.

In step 202, the CPU 101 determines whether or not the money acceptor 132, i.e., a billing device incapable of acquiring user identification information, is connected to the serial interface 115.

If the money acceptor 132 is not connected, i.e., if the IC card reader/writer 131 is connected, the process proceeds to step 204. If the money acceptor 132 is connected, the process proceeds to step 206.

In step 204, the CPU 101 sets multiple-document-selection information, which indicates whether or not selection of multiple documents is permitted, to a permitted state and stores the multiple-document-selection information in the NVRAM 105 so as to allow a user to select multiple documents when the user instructs the image forming apparatus 100 to execute a service related to an image forming process. The multiple-document-selection information is information from which whether or not multiple documents are selectable is determined. When the multiple-document-selection information indicates the permitted state, multiple documents are selectable. When the multiple-document-selection information indicates a prohibited state, multiple documents are not selectable.

In step 206, the CPU 101 sets the multiple-document-selection information to the prohibited state, and stores the multiple-document-selection information in the NVRAM 105.

In step 208, the CPU 101 determines whether or not a print instruction screen is selected by the user from a menu displayed on the display unit 110. If the print instruction screen is not selected by the user, the process proceeds to step 210. If the print instruction screen is selected by the user, the process proceeds to step 212.

If a screen other than the print instruction screen is selected, processing corresponding to the selected screen is executed in step 210.

In step 212, the CPU 101 determines whether or not the multiple-document-selection information indicates the permitted state. If the multiple-document-selection information indicates the permitted state, i.e., if the IC card reader/writer 131 is connected, the process proceeds to step 214. If the multiple-document-selection information indicates the prohibited state, i.e., if the money acceptor 132 is connected, the process proceeds to step 216.

In step 214, the CPU 101 causes the display unit 110 to display a document selection screen on which multiple documents are selectable.

In step 216, the CPU 101 causes the display unit 110 to display a document selection screen on which only a single document is selectable.

In step 218, the CPU 101 determines whether or not a document is selected by the user on the document selection screen. If a document is selected, the process proceeds to step 220. If a document is not selected, the CPU 101 stands by until a document is selected.

In step 220, the CPU 101 determines whether or not multiple documents are selected, i.e., whether or not an instruction to collectively print multiple documents is given. If the collective printing instruction is given, the process proceeds to step 222. If the instruction is not for collective printing, i.e., if only a single document is selected, the process proceeds to step 224.

In step 222, the IC card reader/writer 131 reads user identification information from the IC card 130. The read user identification information and the selected multiple documents are stored in the RAM 104 in association with each other.

In step 224, the CPU 101 determines whether or not billing is enabled, i.e., whether or not a printing process is ready to be started. Specifically, in a case where the IC card reader/writer 131 is connected, the CPU 101 determines whether or not the user has positioned the IC card 130 in the IC card reader/writer 131. In a case where the money acceptor 132 is connected, the CPU 101 determines whether or not money, such as coin, has been inserted into the money acceptor 132. In this manner, the CPU 101 determines whether or not billing is enabled.

If billing is enabled, the process proceeds to step 226. If billing is not enabled, the CPU 101 stands by until billing is enabled.

In step 226, the CPU 101 executes a printing process on the selected document.

In step 228, the user is billed with a printing fee according to the type of the printed document and the number of copies. For example, when money has been inserted into the money acceptor 132, the printing fee is subtracted from the amount of inserted money. Additionally, when the IC card 130 having the electronic money function has been positioned, the amount of remaining electronic money is rewritten to a value obtained by subtracting the printing fee from the amount of remaining electronic money.

In step 230, the CPU 101 determines whether or not there is a document to be printed. If there is no document to be printed, the process returns to step 208 and the above-described steps are repeated. On the other hand, if there is a document to be printed, the process returns to step 224 and the above-described steps are repeated.

If an instruction to execute collective printing of multiple documents is given in a state where the IC card reader/writer 131 is connected, the user is billed in step 228 on condition that the printed document is associated with the user identification information read from the positioned IC card 130. Thus, even if another user instructs the image forming apparatus 100 to print a document from the PC 154 and a document printing process of the other user interrupts the collective printing process, a fee for the document printing process of the other user is not subtracted from the IC card 130 because the document that the other user has instructed the image forming apparatus 100 to print is not associated with the user identification information read from the IC card 130.

When the money acceptor 132 is connected, collective printing of multiple documents is prohibited, and billing is performed every time one document printing process is executed. Thus, even if a document printing process of another user interrupts, the fee for the printing process of the other user is not subtracted from the amount of money inserted by the user.

In this exemplary embodiment, the case has been described in which the IC card 130 has the electronic money function. However, if the IC card 130 has authentication information recorded thereon just like an employee ID card, the user is not billed for the executed printing process using the IC card 130. In this case, an authentication process may be executed in which whether or not the user is permitted to use the image forming apparatus 100 is determined on the basis of the user identification information recorded on the IC card 130 in step 224, instead of determining whether or not billing is enabled. Additionally, in step 228, a process, such as storing the user identification information and the execution result of the printing process in the HDD 106 in association with each other, may be executed as a predetermined process to be executed instead of the billing process. This similarly applies to following exemplary embodiments.

Second Exemplary Embodiment

A second exemplary embodiment of the present invention will now be described. Since the second exemplary embodiment adopts the same apparatus configuration as that adopted in the first exemplary embodiment, the description thereof is omitted.

In the first exemplary embodiment, the case has been described in which connection of the billing device is checked first. In this exemplary embodiment, a case will be described in which connection of the billing device is checked after a print instruction screen is selected.

A process executed by the CPU 101 will now be described with reference to a flowchart illustrated in FIG. 4.

In step 300, as in step 208 of FIG. 3, the CPU 101 determines whether or not a print instruction screen is selected by a user from a menu displayed on the display unit 110. If the print instruction screen is not selected by the user, the process proceeds to step 302. If the print instruction screen is selected by the user, the process proceeds to step 304. Processing in step 302 is the same as the processing in step 210 of FIG. 3. The print instruction screen is a screen on which the user instructs the image forming apparatus 100 to print a document, i.e., a screen on which the user instructs the image forming apparatus 100 to execute an image forming process.

In step 304, as in step 200 illustrated in FIG. 3, the CPU 101 checks whether or not the billing device is connected to at least one of the USB interface 114 and the serial interface 115. In this manner, connection of the billing device is checked after the print instruction screen is selected, i.e., after an instruction to execute an image forming process is given, in this exemplary embodiment.

In step 306, as in step 202 of FIG. 3, the CPU 101 determines whether or not the money acceptor 132, i.e., a billing device incapable of acquiring user identification information, is connected to the serial interface 115.

If the money acceptor 132 is not connected, the process proceeds to step 308. If the money acceptor 132 is connected, the process proceeds to step 310.

Since processing in steps 308 to 324 is the same as the processing in steps 214 to 230 of FIG. 3, respectively, the description thereof is omitted.

In this exemplary embodiment, as in the first exemplary embodiment, if an instruction to execute collective printing of multiple documents is given in a state where the IC card reader/writer 131 is connected, the user is billed in step 322 on condition that the printed document is associated with the user identification information read from the positioned IC card 130. Thus, even if another user instructs the image forming apparatus 100 to print a document from the PC 154 and a document printing process of the other user interrupts the collective printing process, a fee for the document printing process of the other user is not subtracted from the IC card 130 because the document that the other user has instructed the image forming apparatus 100 to print is not associated with the user identification information read from the IC card 130.

When the money acceptor 132 is connected, collective printing of multiple documents is prohibited and billing is performed every time one document printing process is executed. Thus, even if a document printing process of another user interrupts the document printing processes of the user, the fee is not subtracted from the amount of money inserted by the user.

The case in which one of the IC card reader/writer 131 and the money acceptor 132 is connected as the billing device has been described in the first and second exemplary embodiments. If both the IC card reader/writer 131 and the money acceptor 132 are connected to the image forming apparatus 100, collective printing of multiple documents may be prohibited.

Third Exemplary Embodiment

A third exemplary embodiment of the present invention will now be described. Since the third exemplary embodiment adopts the same apparatus configuration as that adopted in the first exemplary embodiment, the description thereof is omitted.

Although the case in which one of the IC card reader/writer 131 and the money acceptor 132 is connected as the billing device has been described in the foregoing exemplary embodiments, a case in which at least one of the IC card reader/writer 131 and the money acceptor 132 is connected will be described in this exemplary embodiment. Specifically, a process to be described below is applicable not only to a case in which one of the IC card reader/writer 131 and the money acceptor 132 is connected to the image forming apparatus 100 but also to a case in which both the IC card reader/writer 131 and the money acceptor 132 are connected to the image forming apparatus 100.

Figure 5:
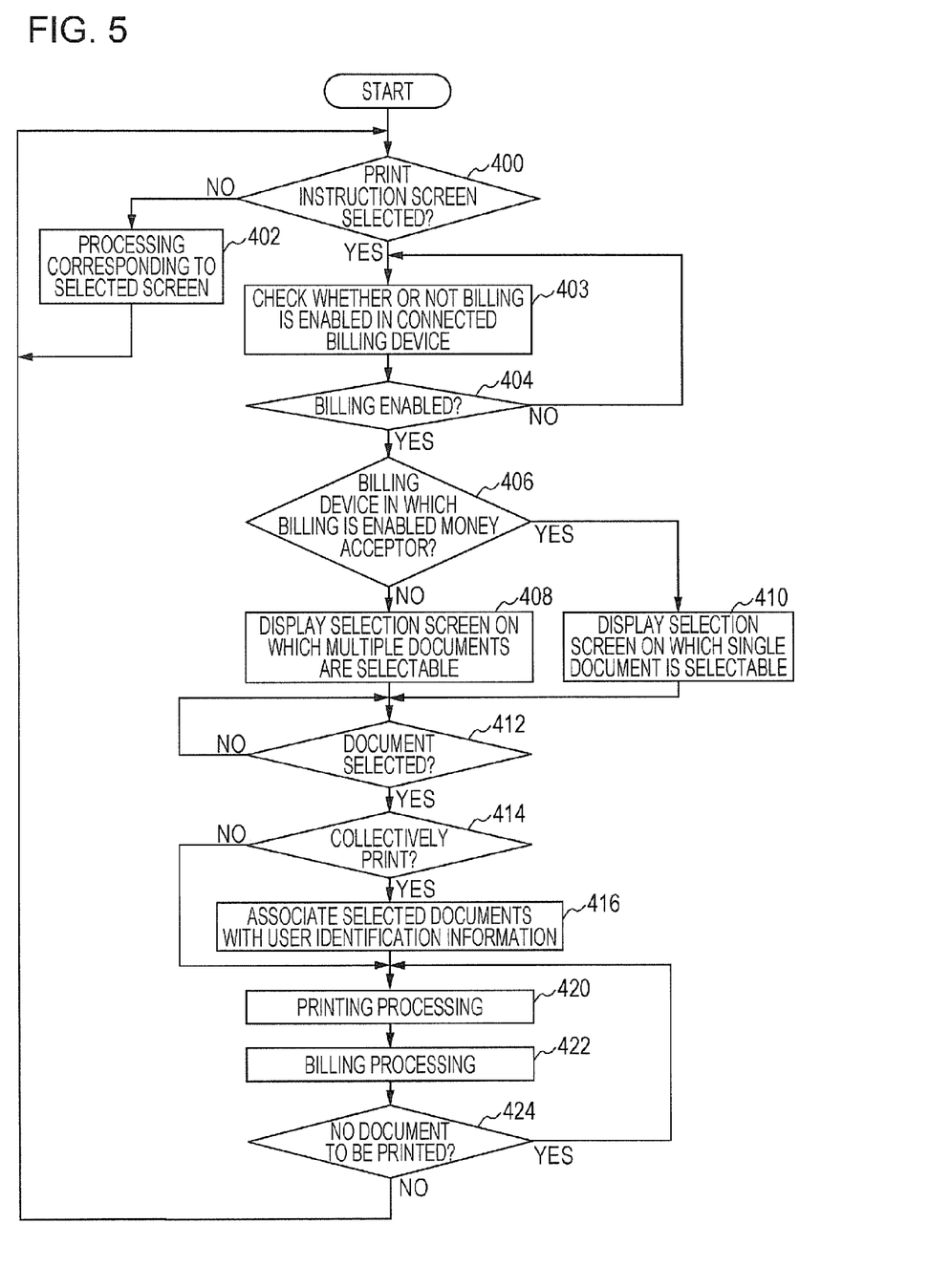
FIG. 5 is a flowchart of a process executed by a CPU of an image forming apparatus according to a third exemplary embodiment.

A process executed by the CPU 101 will now be described with reference to a flowchart illustrated in FIG. 5.

In step 400, as in step 208 of FIG. 3, the CPU 101 determines whether or not a print instruction screen is selected by a user from a menu displayed on the display unit 110. If the print instruction screen is not selected by the user, the process proceeds to step 402. If the print instruction screen is selected by the user, the process proceeds to step 403. Processing in step 402 is the same as the processing in step 210 of FIG. 3.

In step 403, the CPU 101 checks whether or not billing is enabled in each connected billing device. Specifically, the CPU 101 checks whether or not the connected billing device is in a billing enabled state in which the IC card 130 has been positioned in the IC card reader/writer 131, money has been inserted into the money acceptor 132 by the user, or the like.

In step 404, the CPU 101 determines whether or not there is a billing device in which billing is enabled. If the billing-enabled billing device exists, the process proceeds to step 406. If the billing-enabled billing device does not exist, the process returns to step 403 and the CPU 101 stands by until billing is enabled in one of the IC card reader/writer 131 and the money acceptor 132.

In step 406, the CPU 101 determines whether or not the billing-enabled billing device is the money acceptor 132. If the device is the money acceptor 132, the process proceeds to step 410. If the device is the IC card reader/writer 131, the process proceeds to step 408.

Since processing in steps 408 to 416 is the same as the processing in steps 214 to 222 of FIG. 3, respectively, the description thereof is omitted. Additionally, since processing in steps 420 to 424 is the same as the processing in steps 226 to 230 of FIG. 3, respectively, the description thereof is omitted.

As described above, a process of collectively printing multiple documents is prohibited when the billing-enabled billing device is the money acceptor 132 in this exemplary embodiment. Accordingly, billing is performed every time one document printing process is executed. Thus, even if a document printing process of another user interrupts the document printing processes of the user, the fee for the document printing process of the other user is not subtracted from the amount of money inserted by the user.

In this exemplary embodiment, as in the first exemplary embodiment, if an instruction to execute collective printing of multiple documents is given in a state where the IC card reader/writer 131 is connected, the user is billed in step 422 on condition that the printed document is associated with the user identification information read from the positioned IC card 130. Thus, even if another user instructs the image forming apparatus 100 to print a document from the PC 154 and a document printing process of the other user interrupts the collective printing process, a fee for the document printing process of the other user is not subtracted from the IC card 130 because the document that the other user has instructed the image forming apparatus 100 to print is not associated with the user identification information read from the IC card 130.

Fourth Exemplary Embodiment

A fourth exemplary embodiment of the present invention will now be described. Since the fourth exemplary embodiment adopts the same apparatus configuration as that adopted in the first exemplary embodiment, the description thereof is omitted.

In this exemplary embodiment, a case will be described in which both the IC card reader/writer 131 and the money acceptor 132 are connected to the image forming apparatus 100. A process executed by the CPU 101 will now be described with reference to a flowchart illustrated in FIG. 6.

Figure 6:
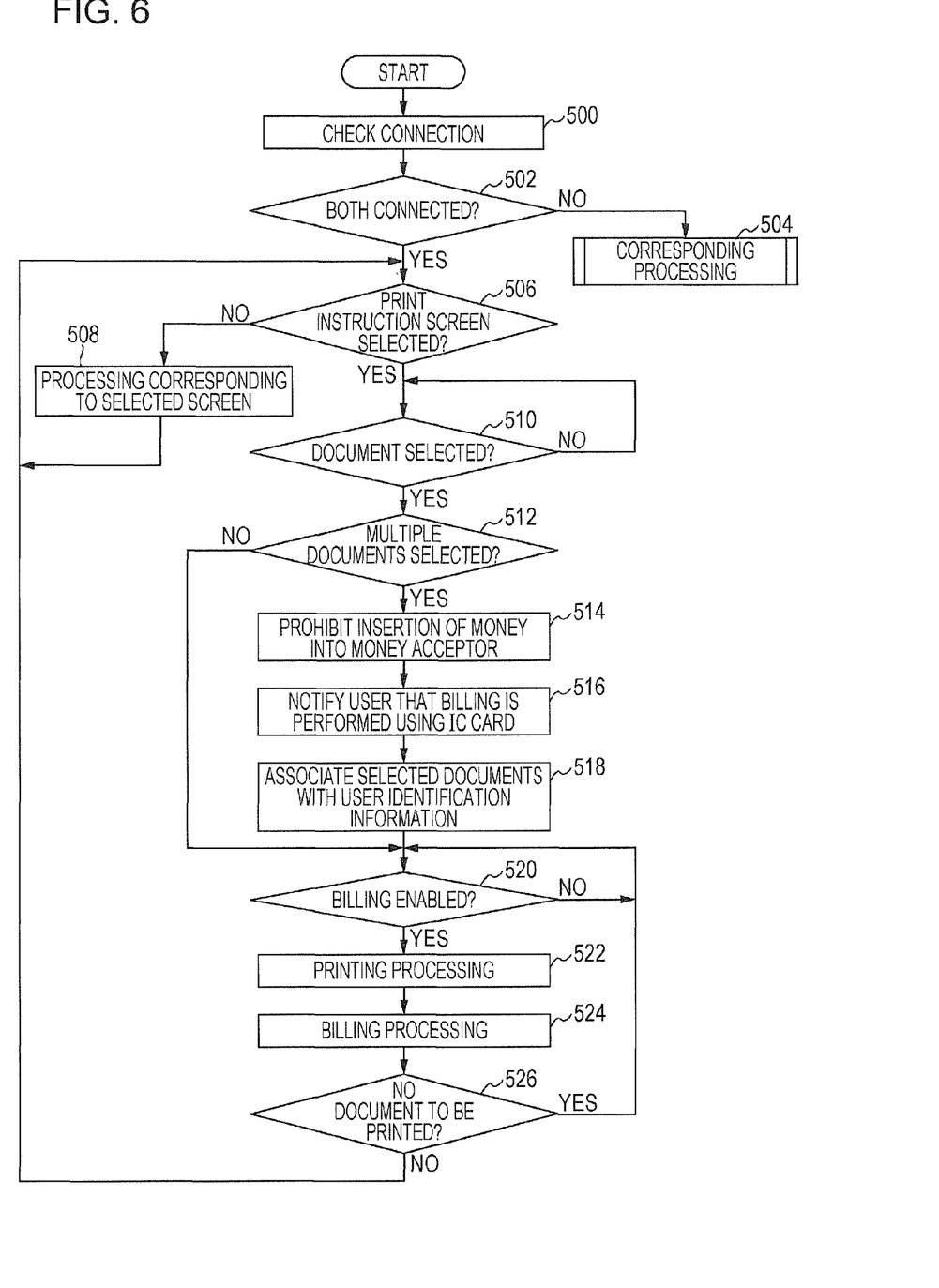
FIG. 6 is a flowchart of a process executed by a CPU of an image forming apparatus according to a fourth exemplary embodiment.

In step 500, as in step 200 of FIG. 3, the CPU 101 checks whether or not the IC card reader/writer 131 is connected and whether or not the money acceptor 132 is connected.

In step 502, the CPU 101 determines whether or not both the IC card reader/writer 131 and the money acceptor 132 are connected to the image forming apparatus 100. If both the IC card reader/writer 131 and the money acceptor 132 are not connected, the process proceeds to step 504. If both the IC card reader/writer 131 and the money acceptor 132 are connected, the process proceeds to step 506.

Figure 4:
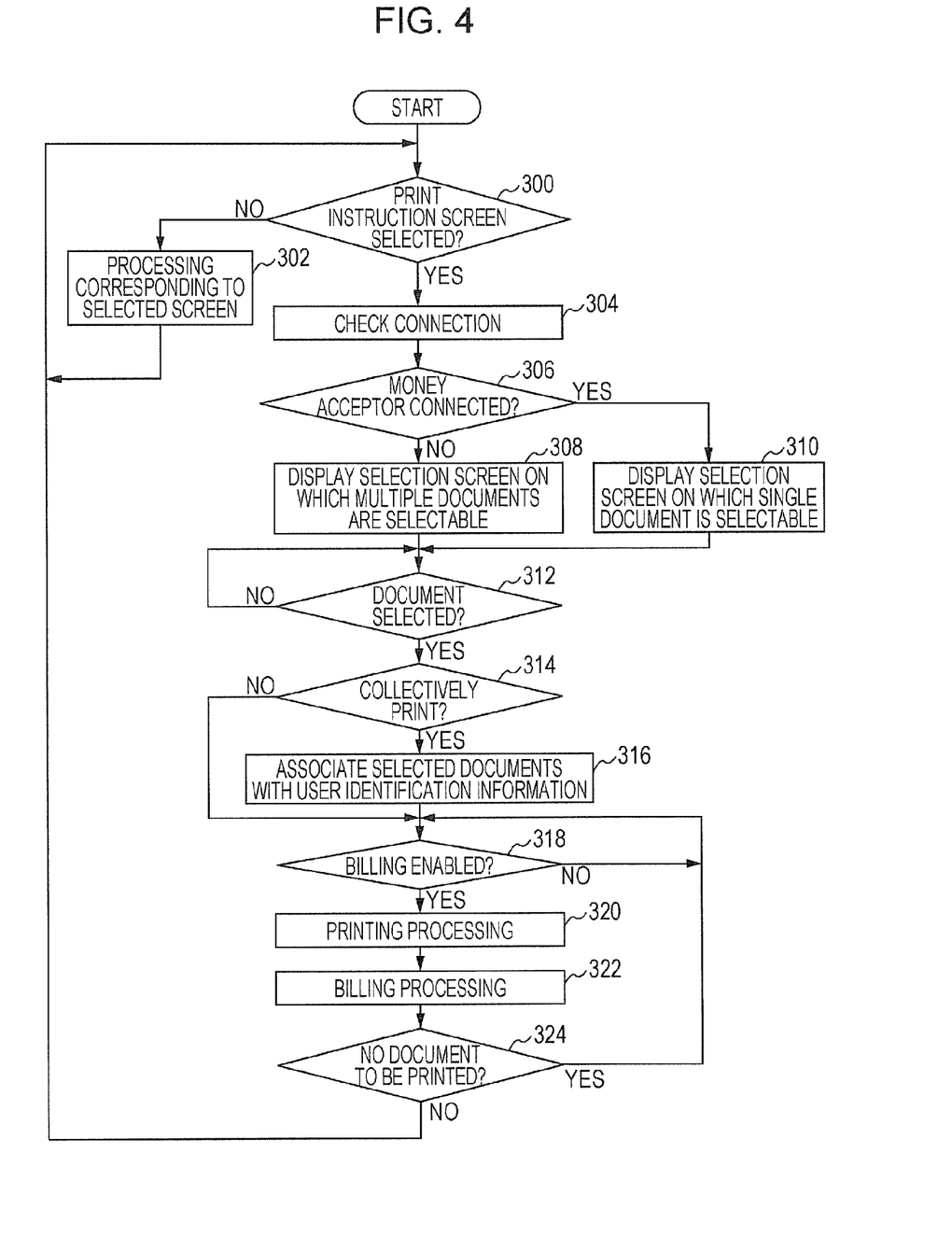
FIG. 4 is a flowchart of a process executed by a CPU of an image forming apparatus according to a second exemplary embodiment.

In step 504, the CPU 101 executes the process illustrated in FIG. 3 described in the first exemplary embodiment or the process illustrated in FIG. 4 described in the second exemplary embodiment if one of the IC card reader/writer 131 and the money acceptor 132 is connected, for example.

In step 506, as in step 208 of FIG. 3, the CPU 101 determines whether or not a print instruction screen is selected by a user from a menu displayed on the display unit 110. If the print instruction screen is not selected by the user, the process proceeds to step 508. If the print instruction screen is selected by the user, the process proceeds to step 510. Processing in step 508 is the same as the processing in step 210 of FIG. 3.

In step 510, as in step 218 of FIG. 3, the CPU 101 determines whether or not a document is selected by the user on a document selection screen. If a document is selected, the process proceeds to step 512. If a document is not selected, the CPU 101 stands by until a document is selected.

In step 512, the CPU 101 determines whether or not multiple documents are selected. If multiple documents are selected, the process proceeds to step 514. If a single document is selected, the process proceeds to step 520.

In step 514, the CPU 101 prohibits the money acceptor 132 from accepting money. For example, the CPU 101 closes a money accepting slot or returns money even if money is inserted.

In step 516, the CPU 101 displays a message on the display unit 110, thereby notifying the user that billing is performed using the IC card 130.

In step 518, as in step 222 of FIG. 3, the IC card reader/writer 131 reads user identification information from the IC card 130. The read user identification information and the selected multiple documents are stored in the RAM 104 in association with each other.

Processing in steps 520 to 526 is the same as the processing in steps 224 to 230 of FIG. 3.

As described above, in this exemplary embodiment, if an instruction to execute collective printing of multiple documents is given in a state where both the IC card reader/writer 131 and the money acceptor 132 are connected to the image forming apparatus 100, insertion of money is prohibited and billing is performed using the IC card 130. Thus, even if another user instructs the image forming apparatus 100 to print a document from the PC 154 and a document printing process of the other user interrupts the collective printing process, a fee for the document printing process of the other user is not subtracted from the IC card 130 because the document that the other user has instructed the image forming apparatus 100 to print is not associated with the user identification information read from the IC card 130.

Although in this exemplary embodiment the case has been described in which insertion of money is prohibited in step 514 when multiple documents are selected, the configuration is not limited to this example. When insertion of money is not prohibited and thus money is inserted, a printing process may be executed on the first document among the multiple documents but not on the other documents. In this case, the CPU 101 may display a message on the display unit 110 so as to notify the user of such a situation.

Alternatively, when both the IC card reader/writer 131 and the money acceptor 132 are connected to the image forming apparatus 100, collective specification of multiple documents may be prohibited if money is inserted, instead of prohibiting insertion of money.

Although a case of using the money acceptor 132 as a billing device incapable of acquiring user identification information has been described in the foregoing exemplary embodiments, a billing device that performs billing using a prepaid card, such as a magnetic card, may be used as the billing device incapable of acquiring the user identification information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an accepting unit that accepts an instruction to execute an image forming process; and
    a controller that controls the accepting unit so as to allow the accepting unit to accept a print instruction to print a single document when a billing device is used and to prohibit the accepting unit from accepting a print instruction to print a plurality of documents when the billing device is used, and not to prohibit the accepting unit from accepting a print instruction to print a plurality of documents when the billing device is not used, wherein the billing device is incapable of acquiring user identification information for identifying a user.

2. The image forming apparatus according to claim 1, wherein upon detection of connection of the billing device, the controller controls the accepting unit so as to prohibit the accepting unit from accepting a print instruction to print a plurality of documents.

3. The image forming apparatus according to claim 2, wherein upon detection of connection of the billing device after power-on of the image forming apparatus, the controller controls the accepting unit so as to prohibit the accepting unit from accepting a print instruction to print a plurality of documents.

4. The image forming apparatus according to claim 2, wherein upon detection of connection of the billing device after instruction of execution of an image forming process, the controller controls the accepting unit so as to prohibit the accepting unit from accepting a print instruction to print a plurality of documents.

5. The image forming apparatus according to claim 1, wherein upon detecting that the billing device is ready to perform billing, the controller controls the accepting unit so as to prohibit the accepting unit from accepting a print instruction to print a plurality of documents.

6. The image forming apparatus according to claim 1, wherein the controller controls the accepting unit so as to permit the accepting unit to accept a print instruction to print a plurality of documents when a user-identification-information acquiring device capable of acquiring user identification information for identifying a user is usable.

7. The image forming apparatus according to claim 6, wherein when the controller permits acceptance of a print instruction to print a plurality of documents, the controller associates the plurality of documents with the user identification information, and
    wherein the user-identification-information acquiring device executes a predetermined process for each of the plurality of documents associated with the user identification information.

8. The image forming apparatus according to claim 1, wherein when both the billing device and a user-identification-information acquiring device capable of acquiring user identification information are connected to the image forming apparatus, the controller controls the accepting unit so as to permit the accepting unit to accept a print instruction to print a plurality of documents, and
    wherein once the accepting unit accepts a print instruction to print a plurality of documents, the controller executes a predetermined process that is based on user identification information acquired by the user-identification-information acquiring device.

9. An image forming apparatus comprising:
    an accepting unit that accepts an instruction to execute an image forming process; and
    a controller that
        controls the accepting unit so as to allow the accepting unit to accept a print instruction to print a single document when a first billing device connected to the image forming apparatus is used, the first billing device being incapable of acquiring user identification information of a user, and to prohibit the accepting unit from accepting a print instruction to print a plurality of documents when the first billing device is used, and
        controls the accepting unit so as to permit the accepting unit to accept a print instruction to print a plurality of documents when a second billing device connected to the image forming apparatus is used, the second billing device identifying a user and billing the user for execution of an image forming process.

10. An image forming method, comprising:
    accepting an instruction to execute an image forming process with an accepting unit of an image forming apparatus; and
    performing control so as to allow the accepting unit to accept a print instruction to print a single document when a billing device is used, and to prohibit the accepting unit from accepting a print instruction to print a plurality of documents when the billing device is used, and not to prohibit the accepting unit from accepting a print instruction to print a plurality of documents when the billing device is not used, wherein the billing device is incapable of acquiring user identification information for identifying a user.

11. A non-transitory computer readable medium storing a program causing a computer to execute a process, the process comprising:
    accepting an instruction to execute an image forming process with an accepting unit of an image forming apparatus; and
    performing control so as to allow the accepting unit to accept a print instruction to print a single document when a billing device is used, and to prohibit the accepting unit from accepting a print instruction to print a plurality of documents when the billing device is used, and not to prohibit the accepting unit from accepting a print instruction to print a plurality of documents when the billing device is not used, wherein the billing device billing is incapable of acquiring user identification information for identifying a user.

12. An image forming apparatus comprising;

a display unit that displays information, and a controller that controls the display unit so as to display a document selection screen on which only a single document is selectable when a billing device is used, and to control the display unit to display a document selection screen on which multiple documents are selectable when the billing device is not used, the billing device billing a user for execution of an image forming process and being incapable of acquiring user identification information for identifying a user.

* * * * *